United States Patent [19]

Ohtsuka

[11] Patent Number: 5,231,619
[45] Date of Patent: Jul. 27, 1993

[54] OPTICAL DISK APPARATUS HAVING IMPROVED TRACKING SERVO MECHANISM

[75] Inventor: Yoshiyuki Ohtsuka, Akishima, Japan

[73] Assignee: Teac Corporation, Japan

[21] Appl. No.: 618,673

[22] Filed: Nov. 27, 1990

[30] Foreign Application Priority Data

Nov. 29, 1989 [JP] Japan .................................. 1-309970

[51] Int. Cl.$^5$ .............................................. G11B 7/00
[52] U.S. Cl. ................................ 369/44.35; 369/44.32
[58] Field of Search ................. 369/32, 33, 44.35, 43, 369/44.14, 44.25, 44.28, 44.29, 44.32, 44.36, 54, 58, 53; 360/78.04, 77.06

[56] References Cited

U.S. PATENT DOCUMENTS

| 4,764,911 | 8/1988 | Morota et al. ....................... 369/32 |
| 5,020,044 | 5/1991 | Shimonou ........................ 369/44.28 |
| 5,090,001 | 2/1992 | Ito et al. ........................... 369/44.28 |

Primary Examiner—Jeffery A. Brier
Assistant Examiner—Robert Chevalier
Attorney, Agent, or Firm—Andrus, Sceales, Starke & Sawall

[57] ABSTRACT

An optical disk apparatus has a tracking servomechanism in which the servotiming is determined by the length of the period of the tracking error signal detected on an optical disk. Because of the eccentricity of the optical disk, the period of the tracking error signal cannot be constant. If the servo loop is closed during a time interval in which the period of the tracking error signal is relatively short, it takes much time to make an optical head follow a predetermined track because the optical head crosses another track before the optical head can be made to follow the predetermined track so that feedback servocontrol must be repeated until the optical head is made to follow the predetermined track. In view of this, in the tracking servomechanism of the optical disk apparatus according to the present invention, the servo loop is closed only when the period of the tracking error signal is so long that only one performance of the feedback servocontrol can make the optical head follow the predetermined track. Consequently, the optical head can be servoed in a relatively short time.

7 Claims, 6 Drawing Sheets

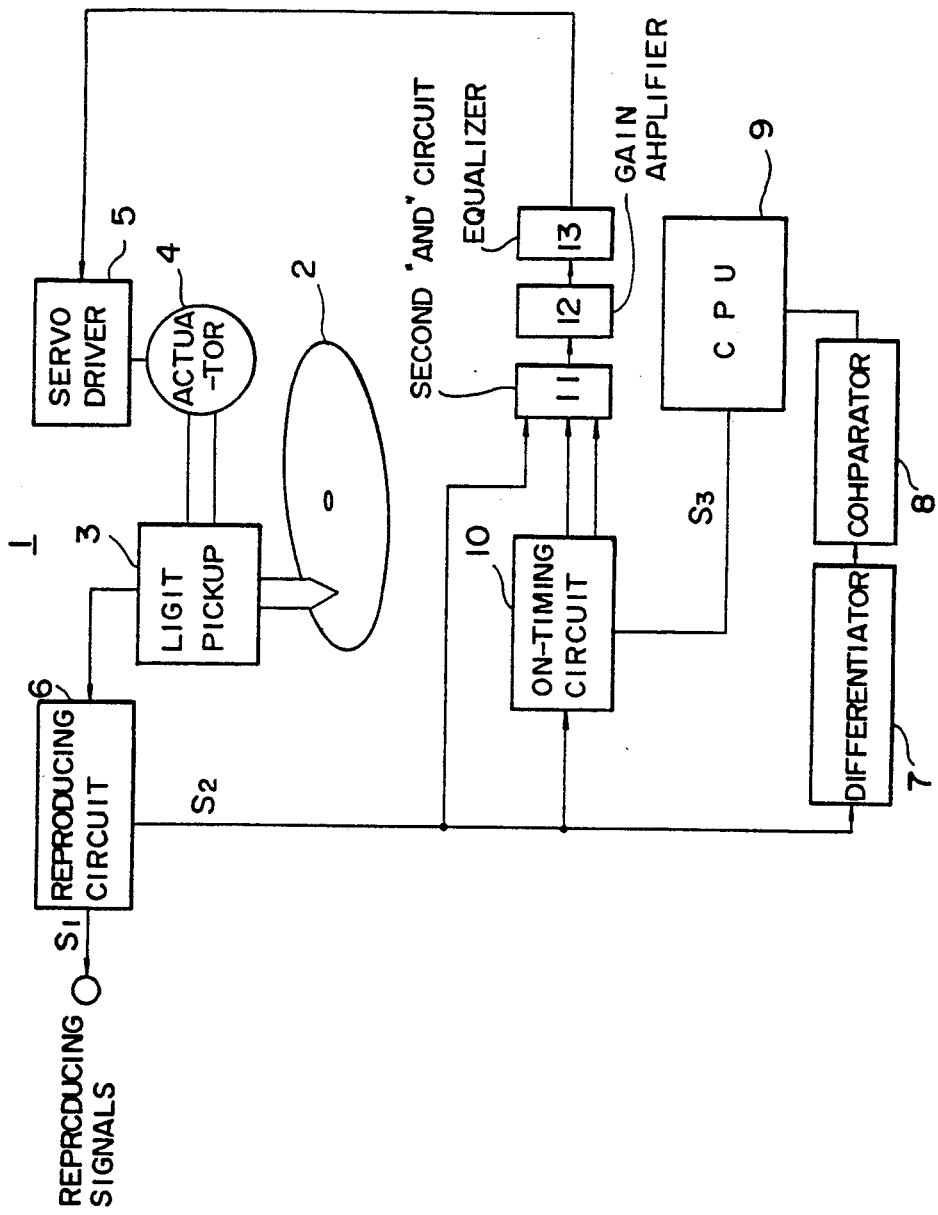

33 GUIDE GROOVES
32 SIDE BEAM
31 MAIN BEAM

DETECTION SIGNAL OF MAIN BEAM
0V

DETECTION SIGNAL OF SIDE BEAM

TRACKING ERROR SIGNAL
0V

OPTICAL DISK APPARATUS HAVING IMPROVED TRACKING SERVO MECHANISM

BACKGROUND OF THE INVENTION

The present invention generally relates to optical disk apparatus, and move particularly to an optical disk storage apparatus having a tracking servomechanism.

In a tracking servomechanism of a conventional optical disk storage apparatus, a tracking servosignal is obtained by means of the push-pull method using a distribution of light bundles diffracted at each of guide grooves on an optical disk. In this method, a servo loop is closed to make the optical head follow the track after an optical actuator moves an optical head to the predetermined track. It takes about 200 ms until the mechanical oscillation of the optical actuator is damped.

However, the above tracking servomechanism has the following disadvantages as it does not consider the eccentricity of the disk. Because of a gap of even up to 100 μm between the center of the disk and the rotational center, which is caused by the eccentricity of the center hole of the disk tracking errors increase during recording and/or reproducing, and/or it takes much time to access a target track. Hereupon, the gap of up to 70 μm between the center of the disk and the rotational center can be permitted. FIG. 1(A) shows a rotating eccentric disk. As shown in the drawing, the center $2a$ of the disk 2 does not correspond to the rotational center 0. The disk rotates 180° in the course of time T from T=t to T=t". FIG.1(B) shows the frequency characteristics of the tracking error signal of the disk shown in FIG.1(A). Because of the eccentricity of the disk, the frequency of the tracking error signal cannot be constant. Needless to say, the more eccentricity the disk has, the higher the frequency of the tracking error signal becomes. At a point $A_1$ where the center $2a$ of the disk, the rotational center 0 and the optical head 3 are aligned with one another, in which time T is equal to t', the head 3 is located in a tangential direction of a track on the disk 2 so that the frequency of the tracking error signal can be low. On the other hand, at a point $A_2$ and a point $A_3$, in which time T is equal to t or t", the head 3 crosses many tracks so that the frequency of the tracking error signal becomes high. Therefore, in the vicinity of the point $A_1$, the period of the tracking error signal is so long that the head 3 can be made to follow the predetermined track by means of the feedback method before the head 3 crosses another track. Accordingly, the head 3 can be rapidly made to follow the predetermined track by means of one performance of feedback control. However, in the vicinity of the points $A_2$ and $A_3$, the period of the tracking error signal is so short that the head 3 crosses another track before the head 3 is made to follow the predetermined track by means of the feedback method. Accordingly, the feedback control should be repeated until the head 3 is made follow the predetermined track, which takes much time. In the conventional optical disk storage, since the servo loop has been closed without considering the frequency of the tracking error signal, the head cannot be easily made to follow the predetermined track in a short time.

SUMMARY OF THE INVENTION

Accordingly, it is a general object of the present invention to provide a novel and useful optical disk apparatus in which the disadvantages described above are eliminated.

Another object of the present invention is to provide an optical disk apparatus having a tracking servomechanism which can servo an optical head in a relatively short time.

Another more specific object of the present invention is to provide an optical disk apparatus which comprises an optical head which reads prerecorded information from a track on an optical disk, moving means, connected to the optical head, for moving the optical head to a predetermined track by means of track information showing the predetermined track at which the optical head is to be positioned, control means, connected to the moving means, for outputting the track information to the moving means to control a moving of the moving means, first detecting means, connected to the optical head and the control means, for detecting a tracking error signal showing an eccentricity of the track by means of the information read by the optical head, second detecting means, connected to the first detecting means, for detecting a time interval having more than a predetermined value in a period of the tracking error signal, and gate means, connected to the first detecting means and the second detecting means, for allowing the tracking error signal detected by the first detecting means to be inputted to the control means only when the second detecting means detects the time interval.

According to the present invention, the tracking error signal from the first detecting means controls the control means only when the second detecting means detects the time interval having more than the predetermined value in the period of the tracking error signal. Therefore the servo loop is closed only when the period of the tracking error signal is long enough, and the feedback control need not be repeated and the optical head can be servoed in a relatively short time.

Other objects and further features of the present invention will become apparent from the following detailed description when read in conjunction with the accompanying drawings.

BRIEF DESCRIPTION OF THE DRAWINGS

FIG. 2 shows a block diagram for explaining a first embodiment of the present invention;

DESCRIPTION OF PREFERRED EMBODIMENTS

Figure 1A:
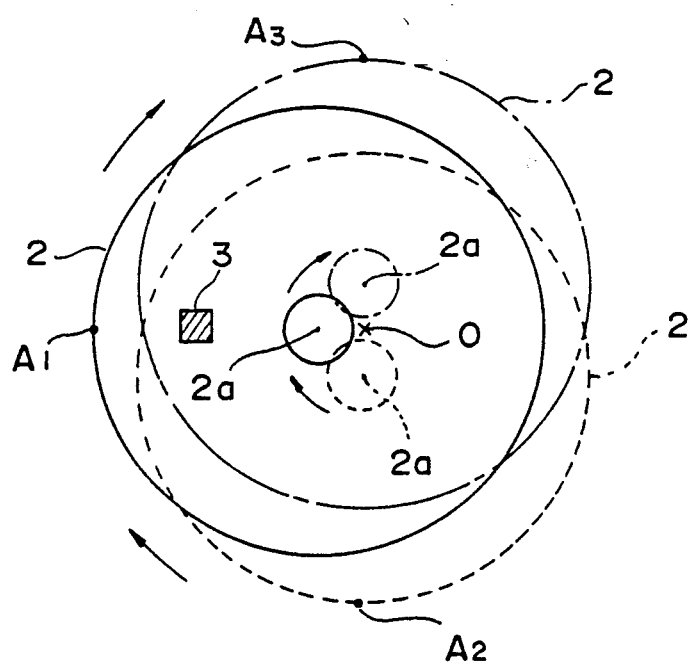
FIG. 1(A) is a plane view of an eccentric optical disk.

A description will now be given of a first embodiment according to the present invention with reference to the drawings.

FIG.2 shows a block diagram of an optical disk apparatus according to the present invention. The optical disk storage 1 has a servomechanism for servoing an optical pickup 3 at an arbitrary track of an optical disk 2.

The servomechanism comprises the optical pickup 3 which is an object to be controlled, an actuator 4 for moving the optical pickup 3, an servodriver 5 for controlling the moving of the actuator 4, a reproducing circuit 6 for generating the tracking error signal $S_2$ showing the eccentricity of the track, and an on-timing circuit 10 for controlling the servotiming.

The pickup 3 emits a laser beam to the optical disk 2 to read information expressed as the length and location of each pit on the track. However, the present invention is not limited to a pickup which is used only for reproducing, and can also be applied to an optical head for recording information on the disk 2 and reproducing it therefrom. The pickup 3 is moved by the linear actuator 4 in the tracking direction. However, the present invention can also be applied to a rotary actuator. The actuator 4 is controlled by the servodriver 5. The servodriver 5 supplies electricity appropriate to the predetermined track at which the pickup 3 is to be positioned to a driving coil of the actuator 4. The actuator 4 positions the pickup 3 at the predetermined track by means of the electricity.

Initially, the pickup 3 is moved in the vicinity of the predetermined track in order to detect the tracking error signal. The location of the pickup 3 is judged by the CPU (Central Processing Unit) 9. The CPU 9 judges how long a distance the pickup 3 has moved by means of counting the pulse of the tracking error signal $S_2$, however, the CPU 9 may also judge the same by means of addresses prerecorded on a address track on the disk 2. A description will now be given of the generating of the tracking error signal.

Signals showing information read on the track by the pickup 3 are inputted to the reproducing circuit 6. The reproducing circuit 6 outputs a reproducing signal $S_1$ and the tracking error signal $S_2$. The term "a reproducing signal $S_1$", as used herein, means a modulated signal appropriate to the location and the length of each pit. And the term "the tracking error signal $S_2$", as mentioned above, means a signal showing the eccentricity of the track. The tracking error signal $S_2$ may be generated by means of the push-pull method, heterodyne method, three beam method and the like, which are well-known. But in this embodiment, the two beam method based on the relevant U.S. Pat. No. 4803677 filed by the applicant same assignee will be used.

Figure 3:
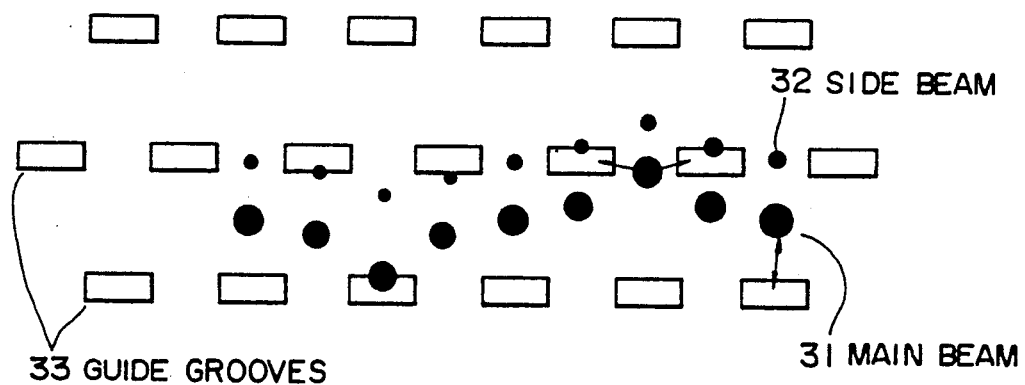
FIG. 3 is a view for explaining how to detect the tracking error signal.
Figure 4A:
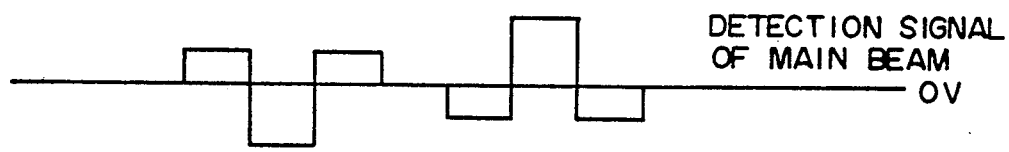
FIG. 4 including FIG. 4(A) to FIG. 4(C) time charts for explaining how to generate the tracking error signal.
Figure 4B:
Figure 4C:

As shown in FIG.3, a light bundle from the pickup 3 is divided into a main beam 31 and a side beam 32. FIG.4(A) shows a time chart of a detecting signal of the main beam, FIG.4(B) shows a time chart of the detecting signal of the side beam, and FIG.4(C) shows a time chart of the tracking error signal. The detecting signal of the main beam is determined by an arrangement between one of a plurality of guide grooves 33 and the main beam 31. The distance from each of the guide grooves 33 to the main beam 31 shows the eccentricity of the track. As the guide grooves 33 are alternated, as shown in FIG.3, plus or minus of the detecting signal of the main beam are reversed according to the alternance. Accordingly, the detecting signal of the main beam is obtained as shown in FIG.4(A). On the other hand, the detecting signal of the side beam shows the direction of the eccentricity of the track. The detecting signal of the side beam can be obtained as shown in FIG.4(B) depending on which side of the main beam 31 each of the guide grooves 33 is located on.

Figure 5:
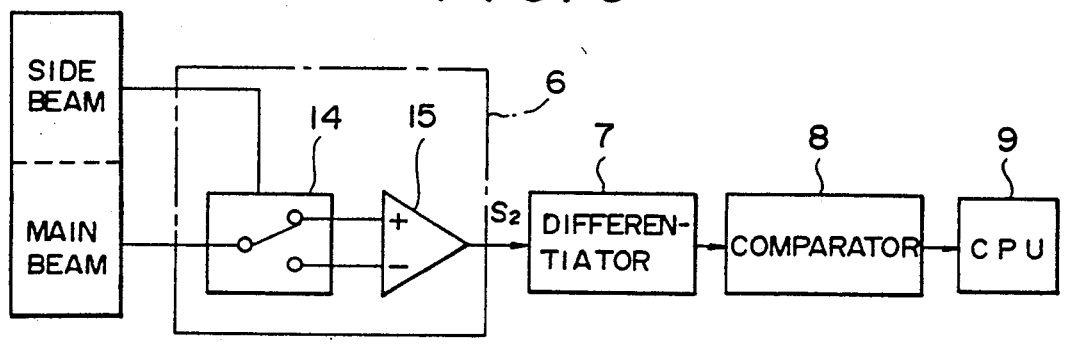
FIG. 5 is a view for explaining a reproducing circuit.

The tracking error signal $S_2$ shown in FIG.4(C) can be generated by reversing the plus or minus of the detecting signal of the main beam shown in FIG.4(A) when the detecting signal of the side beam shown in FIG.4(B) is plus. As shown in FIG.5, the reproducing circuit 6 comprises a selective circuit 14 and an operational amplifier 15. The selective circuit 14 reverses the plus or minus of the detecting signal of the main beam when the detecting signal of the side beam is plus. After reversing, the signal is amplified by the operational amplifier 15 to generate the tracking error signal $S_2$.

Figure 6:
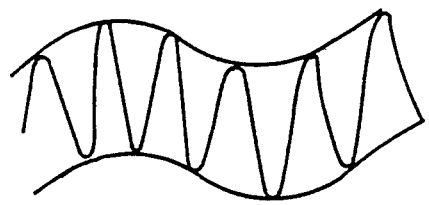
FIG. 6 including FIG. 6(A) to FIG. 6(C) shows time charts of the tracking error signal which is inputted into CPU.
Figure 6:
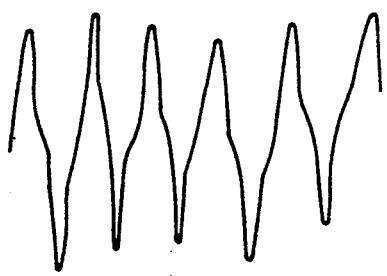
Figure 6:

The tracking error signal $S_2$ is inputted to the CPU 9 via the differentiator 7 and the comparator 8. After the tracking error signal $S_2$ shown in FIG.6(A) passes through the differentiator 7, a pulse mainly comprising leading edges and trailing edges segments, as shown FIG.6(B), is extracted. Subsequently, the pulse is extracted as a square wave as a result of the zero-crossing detection by the comparator 8, and then inputted to the CPU 9. The CPU 9 judges whether or not the pickup 3 has moved in the vicinity of the predetermined track by means of directly counting the pulses of the square wave from the comparator 8.

The tracking error signal $S_2$ is inputted into the on-timing circuit 10 parallel to the CPU 9. On the other hand, the output of the CPU 9 is connected to the on-timing circuit 10. The CPU 9 outputs a tracking servosignal $S_3$ which executes the starting of the servoing to the on-timing circuit 10 when the CPU 9 judges the pickup 3 has moved in the vicinity of the predetermined track. The on-timing circuit 10 has a first "and" circuit 18, which outputs a tracking servoexecuting signal $S_4$ to a second "and" circuit 11 only when the on-timing circuit 10 judges the tracking servosignal $S_3$ has been inputted and the period of the tracking error signal $S_2$ is more than a predetermined value.

A description will now be given of the on-timing circuit 10 of a first embodiment with reference to FIG.7 and FIG.8. FIG.8(A) shows a time chart of the tracking error signal $S_2$ inputted from the reproducing circuit 6 to the comparator 16, FIG.8(B) shows a time chart of the tracking error signal $S_2$ inputted from the comparator 16 to a monostable multivibrator 17, and FIG.8(C) shows a time chart of the tracking error signal $S_2$ inputted from the monostable multivibrator 17 to the first "and" circuit 18. The on-timing circuit 10 comprises the comparator 16 whose noninverting input terminal is connected to the output of the reproducing circuit 6 and whose inverting input terminal is connected to the ground, the monostable multivibrator 17 connected to the output of the comparator 16, and the first "and" circuit 18, one of whose input terminals is connected to the output 0 and the other of whose input terminals is connected to the output of the CPU 9.

Figure 7:
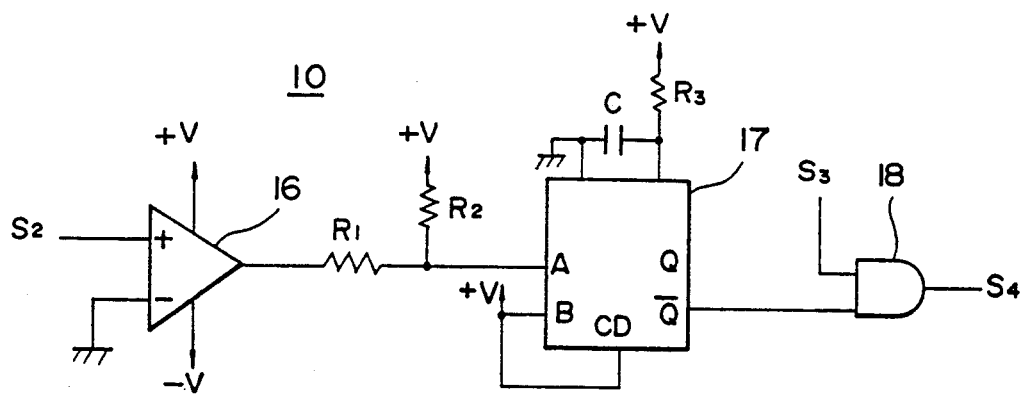
FIG. 7 shows circuitry systems for explaining an on-timing circuit according to a first embodiment.
Figure 8A:
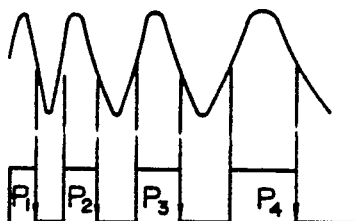
FIG. 8 including FIG. 8(A) to FIG. 8(C) shows time chart of the tracking error signal which is inputted into the on-timing circuit.
Figure 8B:
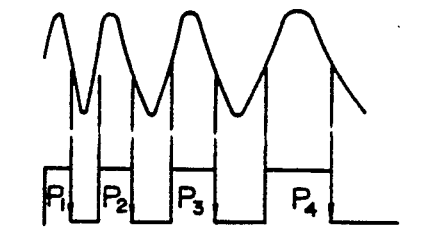
Figure 8C:
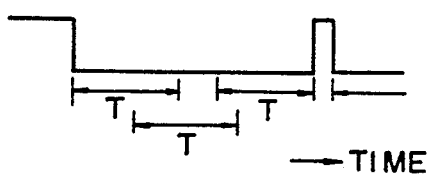

The tracking error signal $S_2$, shown in FIG.7 and FIG.8(A), is inputted into the noninverting input terminal of the comparator 16 so as to be outputted as the square wave as a result of the zero-crossing detection, as shown in FIG.8(B). Though the square wave is convenient for measuring the period of the tracking error signal $S_2$, it is a matter of choice whether or not the comparator 16 is provided. The comparator 16 is connected to a first current source $+V$ and a second current source $-V$. The output of the comparator 16 is connected to A input terminal of the monostable multivibrator 17 via a resistance $R_1$. The multivibrator 17 has A, B, CD (clear input) terminals, a resistance $R_3$, and a capacitor C. The A input terminal is connected to the first current source $+V$ via a resistance $R_2$. The B and CD input terminals are connected to the first current source $+V$ so as to be kept at a high (H) level. And the resistance $R_3$ and the capacitor C are connected to the first current source $+V$.

The monostable multivibrator 17 has a time constant T determined by the resistance $R_3$ and the capacitor C. In this embodiment, the monostable multivibrator 17 is made unstable by a trailing edge trigger of the tracking error signal $S_2$, and it is reset to be stable after a time T passes since the trailing edge trigger has occurred. However, since the monostable multivibrator 17 of the embodiment is retriggerable, if there occurs another subsequent trailing edge trigger in the time T since a prior trailing edge trigger has occurred, it will not be reset to be stable, because the time T is reckoned from the subsequent trailing edge trigger. Therefore, it is not until the period of the tracking error signal $S_2$ becomes more than the time constant T that the monostable multivibrator 17 is made stable. Accordingly, if the monostable multivibrator 17 is preset so that it outputs a signal at the low (L) level when it is unstable and outputs a signal at H level when it is stable, it can output the H level signal to the first "and" circuit 18 when the period of the tracking error signal $S_2$ becomes more than the time constant T. Incidentally, the monostable multivibrator 17 may be preset so that it is made to be unstable by the leading edge trigger of the tracking error signal $S_2$.

A description will now be given of the operation of the monostable multivibrator 17. An output Q is preset to be at H level.

First, the square wave shown in FIG.8(B) is inputted into the A input terminal. The output $\underline{0}$ changes to the L level, as shown in FIG.8(C), by a first trailing edge trigger $P_1$. Since the period from the first trailing edge trigger $P_1$ to a second trailing edge trigger $P_2$ subsequent to the first trailing edge trigger $P_1$ is shorter than the time constant T, the output $\underline{0}$ remains at L level. In addition, since the second trailing edge trigger $P_2$ has occurred during the time constant T, the time constant T is reckoned from the second trailing trigger $P_2$. However, as the period from the second trailing edge trigger $P_2$ to a third trailing edge trigger $P_3$ subsequent to the second trailing edge trigger $P_2$ is also shorter than the time constant T, the output $\underline{0}$ remains at the L level. Moreover, since the third trailing edge trigger $P_3$ has occurred during the time constant T, the time constant T is reckoned from the third trailing trigger $P_3$. The period from the third trailing edge trigger $P_3$ to a fourth trailing edge trigger $P_4$ subsequent to the third trigger $P_3$ is longer than the time constant T. Consequently, after the time constant T has passed since the third trailing trigger $P_3$ until the fourth trailing edge trigger $P_4$, the output $\underline{0}$ changes to the H level. As mentioned above, when the period of the trailing edge pulse from the comparator 16 is longer than the time constant T, the output $\underline{0}$ of the monostable multivibrator 17 outputs an acknowledge signal. The acknowledge signal means that the period of the tracking error signal $S_2$ has become more than a predetermined value. The time constant T can be adjusted, needless to say, by means of changing the value of the resistance $R_3$ and the capacitor C.

Figure 1B:
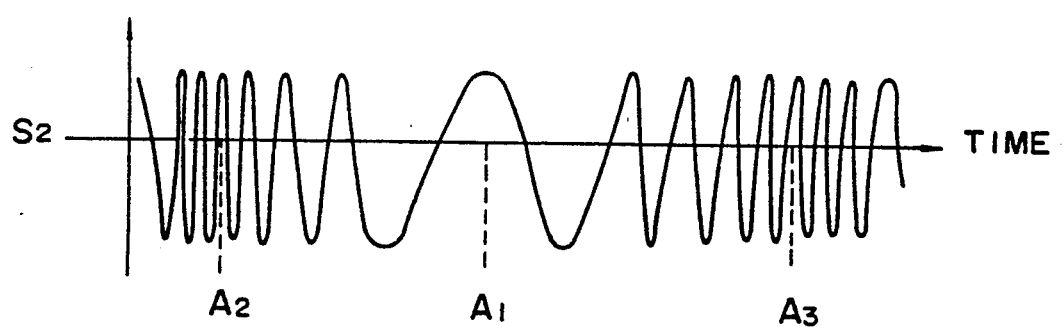
FIG. 1(B) shows frequency characteristics of the tracking error signal of the optical disk shown in FIG.1(A)

The first "and" circuit 18 outputs the tracking servoexecuting signal $S_4$ to the second "and" circuit 11 shown in FIG. 2 only when the tracking servosignal $S_3$ from the CPU 9 and the acknowledge signal from the output $\underline{0}$ of the monostable multivibrator 17 are inputted therein. The tracking servoexecuting signal $S_4$, like the tracking servosignal $S_3$, is a signal executing the starting of the servoing. Thus, the servo loop is closed in the vicinity of the point $A_1$ in FIG. 1.

The second "and" circuit 11 functions as a gate which allows the tracking error signal $S_2$ to be inputted to the servodriver 5 only when the tracking servoexecuting signal $S_4$ is inputted therein.

The two input terminals of the second "and" circuit 11 are connected to the output of the reproducing circuit 6 and the output of the on-timing circuit 10, respectively. The tracking error signal $S_2$ is amplified by a gain amplifier 12 and shaped by an equalizer 13 so as to be outputted to the servodriver 5. In this embodiment, two "and" circuits 11 and 18 are used for the three signals, such as the tracking error signal $S_2$, the tracking servosignal $S_3$, and the acknowledge signal from the output $\underline{0}$. However, one "and" circuit having three input terminals can be used, instead. Since the optical disk storage 1 according to the present invention closes the servo loop when the period of the tracking error signal $S_2$ becomes more than a predetermined value, the feedback operation need not be repeated so that the head 3 can be made to follow the predetermined track in a shorter time than the conventional optical disk storage. Concretely speaking, it takes about 5 ms to servo the head in the conventional optical disk storage, as opposed to 100 $\mu$s in the present invention.

Figure 9:
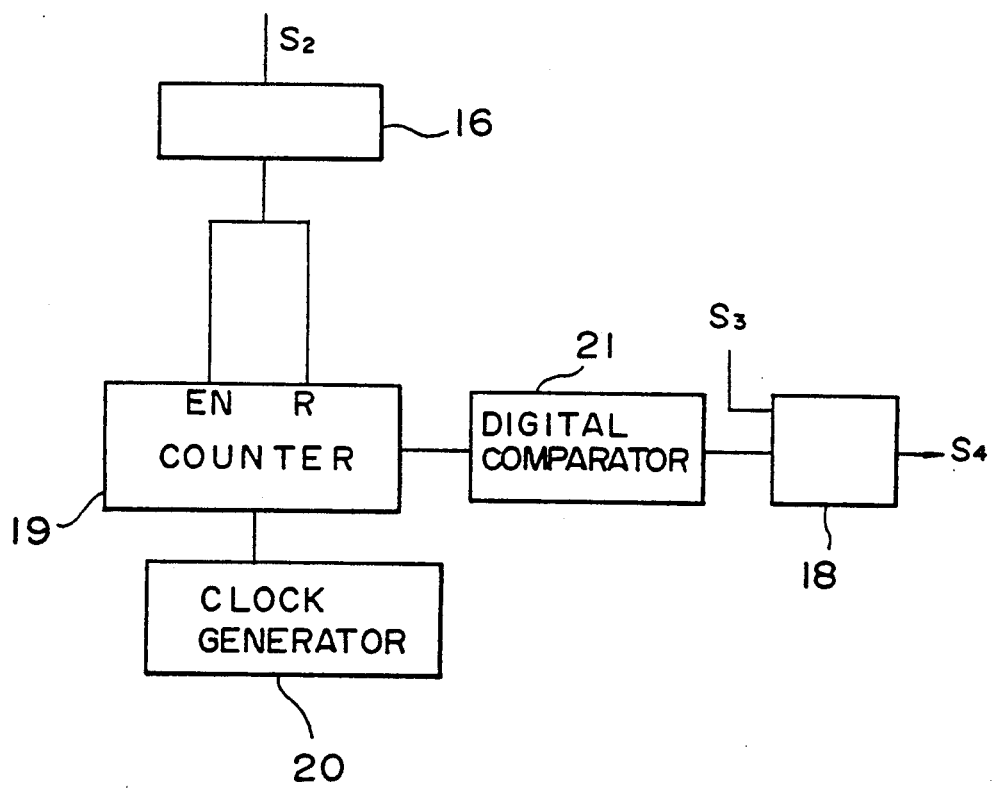
FIG. 9 is a block diagram of the on-timing circuit according to a second embodiment.

As long as it can measure the period of the tracking error signal $S_2$, the on-timing circuit 10 is not limited to that described in the first embodiment A description will now be given of the on-timing circuit 10 of a second embodiment with reference to FIG. 9. The on-timing circuit 10 according to the second embodiment comprises the comparator 16, a counter 19, a clock generator 20, a digital comparator 21, and the first "and" circuit 18. Hereupon, since the comparator 16 and the first "and" circuit 18 are essentially the same as those described in FIG.7, a description thereof will be omitted.

The tracking error signal $S_2$ is extracted as the square wave by the comparator 16 so as to be inputted to the counter 19. The output of the comparator 16 is connected to the input terminals (EN) and (R) of the counter 19. On the other hand, the counter 19 is connected to the clock generator 20 which generates a basic clock pulse signal. The counter counts how many of the basic clock pulses can be included during the predetermined period of the inputted tracking error signal $S_2$. The counter 19 operates when the trailing edge trigger of the tracking error signal $S_2$ is inputted therein, and is reset when the leading edge trigger is inputted therein. In other words, the EN input terminal allows the trailing edge trigger of the tracking error signal $S_2$ to be inputted therein, and the R input terminal allows the leading edge trigger to be inputted therein. Therefore, the counter 19 counts the number of the basic clock pulses including the half period in FIG.8(B), and then outputs it to the digital comparator 21.

The digital comparator 21 compares the number from the counter 19 with a predetermined value which has been inputted in advance, and outputs a predetermined acknowledge signal to the first "and" circuit 18 only when the number from the counter 19 becomes more than the predetermined value. Needless to say, the predetermined value is determined on the basis of the number of the basic clock pulses during the half period. The same effect as in the first embodiment can also be obtained in this embodiment.

As mentioned above, according to the present invention, a head will be made to follow a predetermined track in a relatively short time. The present invention can be applied to optical magnetic disk apparatus as well as optical disk apparatus.

Further, the present invention is not limited to these preferred embodiments, but various variations and modifications may be made without departing from the scope of the present invention.

What is claimed is:

1. An optical disk apparatus comprising:
   an optical head which reads prerecorded information from a track on an optical disk;
   moving means, connected to said optical head, for moving said optical head to a predetermined track;
   control means, connected to said moving means, for outputting track information to said moving means to control a moving of said moving means so that said moving means moves said optical head to the predetermined track, the track information including information relating to the predetermined track;
   first detecting means, connected to said optical head and said control means, for detecting a tracking error signal showing an eccentricity of the track by means of information read by said optical head;
   second detecting means, connected to said first detecting means, for detecting a time interval having more than a predetermined value in a period of the tracking error signal;
   gate means, connected to said first detecting means and said second detecting means, for allowing the tracking error signal detected by said first detecting means to be inputted to said control means only when said second detecting means detects the time interval, the tracking error signal controlling said control means when the tracking error signal is inputted to said control means; and
   third detecting means, coupled to said optical head, and connected to said gate means, for detecting the moving of said optical head to the predetermined track, said gate means allowing the tracking error signal to be inputted to said control means only when said third detecting means detects that the optical head has moved to the predetermined track and said second detecting means detects the time interval.

2. An optical disk apparatus according to claim 1, wherein said third detecting means is also connected to the first detecting means and detects a location of said optical head by means of counting a pulse of the tracking error signal from said first detecting means.

3. An optical disk apparatus according to claim 2, wherein said optical disk apparatus further comprises a differentiator connected to said first detecting means, the tracking error signal being inputted to said third detecting means via said differentiator.

4. An optical disk apparatus according to claim 3, wherein said optical disk apparatus further comprises a first frequency detector connected to said differentiator and said third detecting means, the tracking error signal being inputted from said differentiator to said first frequency. detector so as to be zero-crossing detected, and thereafter, inputted from said first frequency detector to said third detecting means.

5. An optical disk apparatus according to claim 1, wherein said second detecting means comprises a retriggerable monostable multivibrator which is made unstable by a trigger of the tracking error signal.

6. An optical disk apparatus according to claim 5, wherein said second detecting means further comprises a second frequency detector, connected to said first detecting means and the retriggerable monostable multivibrator, for zero-crossing detecting the tracking error signal, the tracking error signal being inputted from the second frequency detector to the retriggerable monostable multivibrator.

7. An optical disk apparatus according to claim 1, wherein said second detecting means comprises:
   a clock generator for generating a basic clock pulse signal;
   a counter, connected to the clock generator, for counting how many of the basic clock pulses are included during the period of the tracking error signal;
   a comparator, connected to the counter, for comparing the value counted by the counter with a predetermined value, the comparator outputting an acknowledge signal to said gate means when the counted value is more than the predetermined value; and
   a third frequency detector, connected to said first detecting means and the counter, for zero-crossing detecting the tracking error signal, the tracking error signal being inputted from the third frequency detector to the counter.

* * * * *